US010893100B2

United States Patent
Jamjoom et al.

(10) Patent No.: US 10,893,100 B2
(45) Date of Patent: Jan. 12, 2021

(54) PROVIDING AGENTLESS APPLICATION PERFORMANCE MONITORING (APM) TO TENANT APPLICATIONS BY LEVERAGING SOFTWARE-DEFINED NETWORKING (SDN)

(71) Applicant: International Business Machines Corporation, Armonk, NY (US)

(72) Inventors: Hani T. Jamjoom, Cos Cob, CT (US); Shriram Rajagopalan, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 15/042,721

(22) Filed: Feb. 12, 2016

(65) Prior Publication Data

US 2016/0269482 A1  Sep. 15, 2016

Related U.S. Application Data

(60) Provisional application No. 62/132,313, filed on Mar. 12, 2015.

(51) Int. Cl.
*H04L 12/26* (2006.01)
*H04L 29/06* (2006.01)
(Continued)

(52) U.S. Cl.
CPC ...... *H04L 67/1095* (2013.01); *H04L 43/0852* (2013.01); *H04L 45/64* (2013.01); *H04L 47/12* (2013.01); *H04L 49/70* (2013.01)

(58) Field of Classification Search
CPC ..... H04L 43/062; H04L 43/12; H04L 12/633; H04L 41/0893; H04L 47/2441; H04L 67/10
See application file for complete search history.

(56) References Cited

U.S. PATENT DOCUMENTS 7,860,006 B1 * 12/2010 Kashyap ............. H04L 41/0893
370/235
7,979,555 B2   7/2011 Rothstein
(Continued)

FOREIGN PATENT DOCUMENTS

WO   WO 2016078729   *   5/2016

OTHER PUBLICATIONS

Big Tap Monitoring Fabric. Big Switch Networks. Feb. 10, 2014, pp. 1-4.
(Continued)

*Primary Examiner* — Nicholas R Taylor
*Assistant Examiner* — Ho T Shiu
(74) *Attorney, Agent, or Firm* — JoAnn Crockatt; Otterstedt, Wallace & Kammer, LLP

(57) ABSTRACT

A computing system includes a plurality of physical hosts; a first application of a first tenant and a second application of a second tenant distributed over the plurality of physical hosts; and a plurality of virtual switches with a plurality of ports, each switch associated with a corresponding one of the physical hosts. A first virtual network couples the plurality of first application components and a second virtual network, isolated from the first virtual network, couples the plurality of second application components. A cloud management dashboard coupled to a software defined network controller is configured to receive an application performance monitoring request from a tenant and instruct the software defined network controller to turn on port mirroring on at least a portion of those of the plurality of ports corresponding to the application of the requesting tenant, to mirror corresponding packets to a packet data repository.

16 Claims, 11 Drawing Sheets

(51) Int. Cl.
| | | |
|---|---|---|
| *H04L 29/08* | (2006.01) | |
| *H04L 12/46* | (2006.01) | |
| *G06F 11/30* | (2006.01) | |
| *G06F 11/34* | (2006.01) | |
| *G06F 12/14* | (2006.01) | |
| *H04L 12/931* | (2013.01) | |
| *H04L 12/715* | (2013.01) | |
| *H04L 12/801* | (2013.01) | |

(56) References Cited

U.S. PATENT DOCUMENTS

| | | | | |
|---|---|---|---|---|
| 8,626,912 | B1 | 1/2014 | Rothstein | |
| 2007/0056038 | A1* | 3/2007 | Lok | H04L 63/1416 726/23 |
| 2011/0276682 | A1* | 11/2011 | Ding | G06F 9/54 709/224 |
| 2014/0052624 | A1 | 2/2014 | Bansal | |
| 2014/0052857 | A1 | 2/2014 | Bansal | |
| 2014/0068068 | A1 | 3/2014 | Bansal | |
| 2014/0201838 | A1* | 7/2014 | Varsanyi | G06F 21/552 726/23 |
| 2015/0039744 | A1 | 2/2015 | Niazi et al. | |
| 2016/0182336 | A1* | 6/2016 | Doctor | H04L 43/062 709/224 |
| 2016/0308745 | A1* | 10/2016 | Couture | H04L 67/42 |
| 2017/0315836 | A1* | 11/2017 | Langer | G06F 9/45558 |

OTHER PUBLICATIONS

Arista, Riverbed Performance and Management and Arista DANZ. Downloaded from http://www.nu.co.za/images/Arista/Tap_Aggregation/RVBD_PartnerBrief_Arista_Final.pdf on Jan. 28, 2016. pp. 1-3.
Apache Kafka. Downloaded from http://kafka.apache.org/ on Feb. 7, 2016. p. 1.
Apache Spark. Downloaded from http://spark.apache.org/ on Jan. 13, 2016. pp. 1-5.
Auto Scaling. Downloaded from https://aws.amazon.com/autoscaling/ on Jan. 13, 2016. pp. 1-4.
Docker (software). Downloaded from https://en.wikipedia.org/wiki/Docker_%28software%29 on Jan. 11, 2016. pp. 1-6.
Peter Mell & Timothy Grance. NIST special publication 800-145. Sep. 2011. pp. 1-7.
Powering Data Search, Log Analysis, Analytics | Elastic. Downloaded from https://www.elastic.co/products on Jan. 13, 2016. pp. 1-5.
Tap vs Span. Downloaded from http://www.networkinstruments.com/includes/popups/taps/tapvsspan.php on Mar. 12, 2015. pp. 1-2.
Windows Azure Diagnostic Monitoring and Autoscaling. Downloaded from https://www.paraleap.com/ on Jan. 13, 2016. pp. 1-2.
Benjamin H. Sigelman et al. Dapper, a Large-Scale Distributed Systems Tracing Infrastructure. Google Technical Report dapper-2010-1, Apr. 2010. pp. 1-14.
Apache Spark, Lightning-fast cluster computing, downloaded from http://spark.apache.org/ on Feb. 12, 2016. pp. 1-3.
Application Performance Management & Monitoring _AppDynamics. Downloaded from https://www.appdynamics.com/ on Jan. 28, 2016. pp. 1-9.
Application Performance Management & Monitoring _ New Relic. Downloaded from http://newrelic.com/ on Jan. 28, 2016. pp. 1-4.
Rodrigo Fonseca et al. X-Trace: A Pervasive Network Tracing Framework. NSDI '07: 4th USENIX Symposium on Networked Systems Design, USENIX Association & Implementation. pp. 271-284, Apr. 9, 2007.
IBM Tivoli Composite Application Manager. Downloaded from http://www-03.ibm.com/software/products/en/tivoli-monitoring-composite-app-mgmt on Jan. 28, 2016. pp. 1-2.
Fluke Networks. Downloaded from http://www.flukenetworks.com/ on Jan. 28, 2016. pp. 1-2.
Michael Chow et al. The Mystery Machine: End-to-end Performance Analysis of Large-scale Internet Services. In the Proceedings of the 11th USENIX Symposium on Operating Systems Design and Implementation. Oct. 6-8, 2014. pp. 1-15.
Xu Zhao et al. Iprof: A Non-intrusive Request Flow Profiler for Distributed Systems. In the Proceedings of the 11th USENIX Symposium on Operating Systems Design and Implementation. Oct. 6-8, 2014. pp. 1-17.
Kanak Agarwal et al. SDN traceroute: Tracing SDN Forwarding without Changing Network Behavior. HotSDN'14, Aug. 22, 2014. pp. 1-6.
Myunghwan Kim et al. Root Cause Detection in a Service-Oriented Architecture. SIGMETRICS'13, Jun. 17-21, 2013. pp. 1-11.
Shriram Rajagopalan et al. Realtime Performance Profiling & Analytics for Microservices using Spark. Downloaded from http://www.spark.tc/real-time-application-performance-profiling-using-spark/ on Feb. 6, 2016. pp. 1-7.
Neumeyer, L. et al. "S4: Distributed Stream Computing Platform," in IEEE International 30 Conference on Data Mining Workshops (ICDMW), 2010. pp. 1-8.
Zzikopoulos, P. et al. Understanding Big Data: Analytics for Enterprise Class Hadoop and Streaming Data, 1st ed. 2011. pp. 1-166.
ExtraHop. Downloaded from https://www.extrahop.com/ on Jan. 28, 2016. pp. 1-12.
Hunt, P., et al. "ZooKeeper: Wait-free Coordination for Internet-scale Systems," in Proc. of USENIX Annual Technical Conference (ATC) (2010), pp. 1-14.
Aguilera, M. K. et al. Performance Debugging for Distributed Systems of Black Boxes, in Proc. of ACM Symposium on Operating Systems Principles (SOSP) (2003). pp. 1-16.
Eureka. AWS Service registry for resilient mid-tier load balancing and failover, downloaded from https://github.com/Netflix/eureka/ on Feb. 12, 2016, pp. 1-2.

* cited by examiner

PROVIDING AGENTLESS APPLICATION PERFORMANCE MONITORING (APM) TO TENANT APPLICATIONS BY LEVERAGING SOFTWARE-DEFINED NETWORKING (SDN)

CROSS-REFERENCE TO RELATED APPLICATIONS

This application claims the benefit of U.S. Provisional Application Ser. No. 62/132,313 filed 12 Mar. 2015, entitled System for Cloud Operators Provide Agentless Application Performance Monitoring (APM) to Tenant Applications by Leveraging Software-Defined Networking (SDN), the complete disclosure of which is expressly incorporated herein by reference in its entirety for all purposes.

STATEMENT OF GOVERNMENT RIGHTS

Not Applicable.

FIELD OF THE INVENTION

The present invention relates to the electrical, electronic and computer arts, and, more particularly, to cloud computing and the like.

BACKGROUND OF THE INVENTION

Application performance monitoring (APM) in distributed applications involves tracking performance of individual transactions as they flow through various components, monitoring the performance of individual components, identifying the performance bottlenecks during runtime, and pin-pointing the cause of the anomaly.

SUMMARY OF THE INVENTION

Principles of the invention provide techniques for cloud operators to provide agentless application performance monitoring (APM) to tenant applications by leveraging software-defined networking (SDN). In one aspect, an exemplary computing system includes a packet data repository; a plurality of physical hosts; a first application of a first tenant, including a plurality of first application components, distributed over the plurality of physical hosts; a second application of a second tenant, including a plurality of second application components, distributed over the plurality of physical hosts; and a plurality of virtual switches, each associated with a corresponding one of the physical hosts. Each of the virtual switches has a plurality of ports. Also included are a first virtual network coupling the plurality of first application components; a second virtual network, isolated from the first virtual network, coupling the plurality of second application components; and a software defined network controller coupled to the virtual switches. Yet further, the system includes a cloud management dashboard coupled to the software defined network controller and configured to receive an application performance monitoring request from at least one of the first tenant and the second tenant, and, responsive to the application performance monitoring request, instruct the software defined network controller to turn on port mirroring on at least a portion of those of the plurality of ports corresponding to the application of the at least one of the first tenant and the second tenant, to mirror corresponding packets to the packet data repository.

In another aspect, a method is disclosed for providing agentless application performance monitoring in a system wherein a first application of a first tenant, including a plurality of first application components, is distributed over a plurality of physical hosts and coupled by a first virtual network, and wherein a second application of a second tenant, including a plurality of second application components, is distributed over the plurality of physical hosts and coupled by a second virtual network, isolated from the first virtual network. The method includes receiving, at a cloud management dashboard, an application performance monitoring request from at least one of the first tenant and the second tenant; and, responsive to the application performance monitoring request, the cloud management dashboard instructing a software defined network controller to turn on port mirroring. The software defined network controller is coupled to the cloud management dashboard, and a plurality of virtual switches each associated with a corresponding one of the physical hosts. Each of the virtual switches has a plurality of ports. The cloud management dashboard instructs the software defined network controller to turn on the port mirroring on at least a portion of those of the plurality of ports corresponding to the application of the at least one of the first tenant and the second tenant, to mirror corresponding packets to a packet data repository.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects; for example, one or more embodiments provide any one, some, or all of the following benefits:

agentless network-based application performance monitoring which scales easily as a cloud operator's data center network grows;

requires no additional investment in specialized hardware for performing APM;

adapts easily to changes in application topology, due to elastic scaling and addition and/or removal of new types of services to the application;

profiling system that reduces overhead on the network during profiling by capturing traffic only from switches and ports pertaining to the application's deployment;

profiling system that is capable of monitoring a select subset of the application's components touched by a given request using a combination of heuristics and on-demand packet port mirroring along the course of request execution;

on-demand system-level performance profiling tool for multi-tenant cloud environments hosting modern microservice-based applications;

simplified profiling architecture that leverages the SDN and edge-switches to capture profiling data instead of using hardware middleboxes;

allows for efficiently locating bottlenecks in distributed applications to facilitate correction of same.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
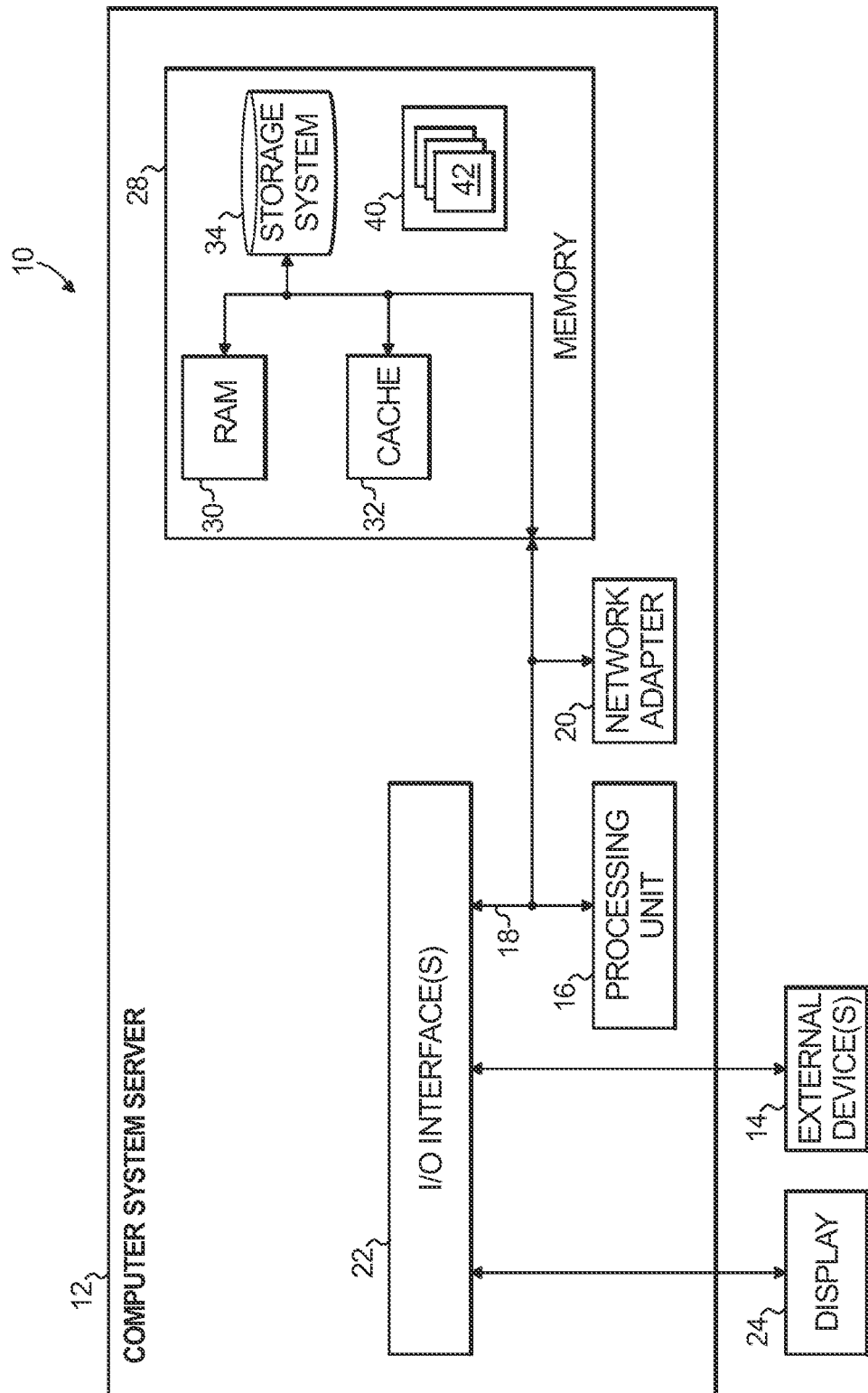
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
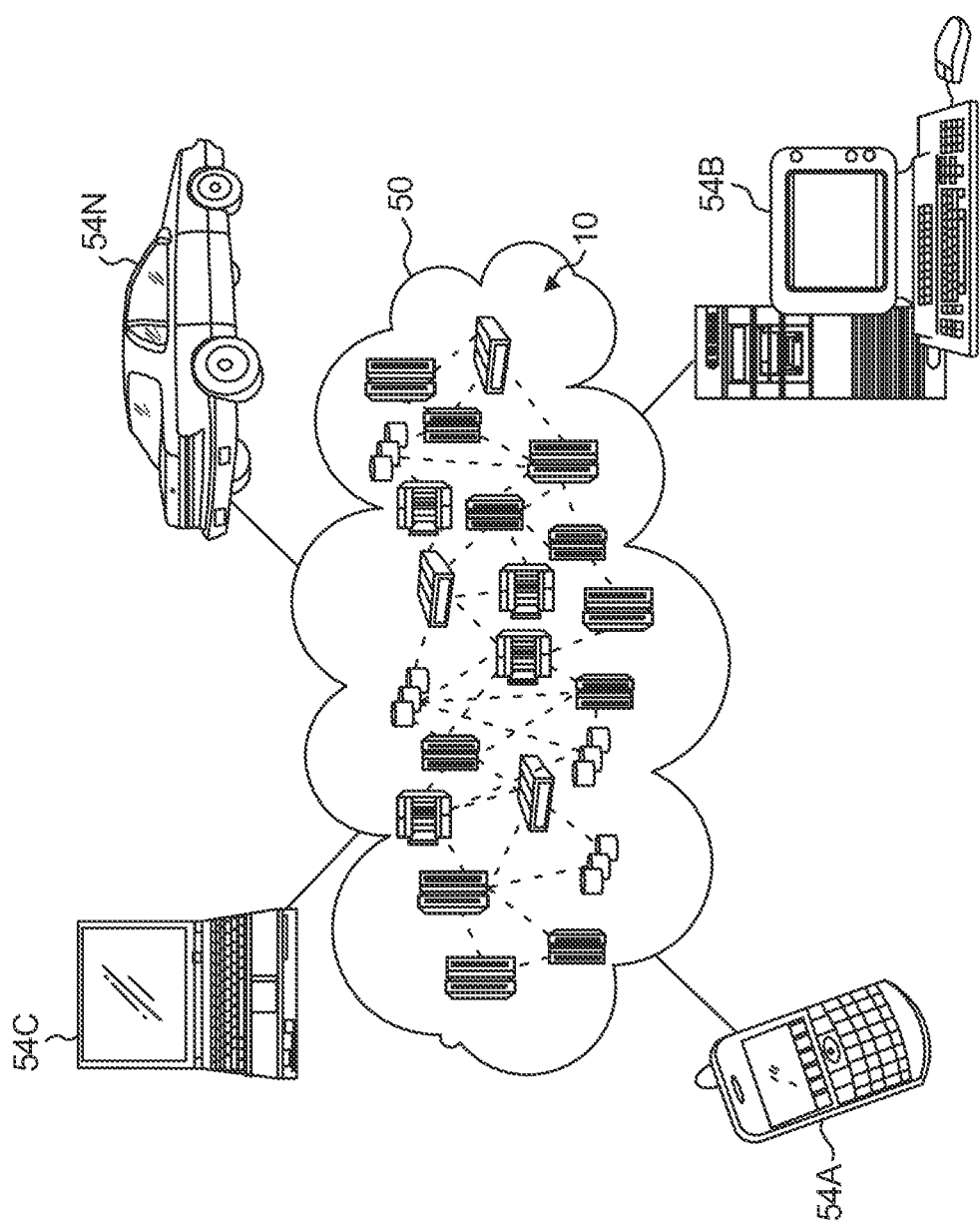
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
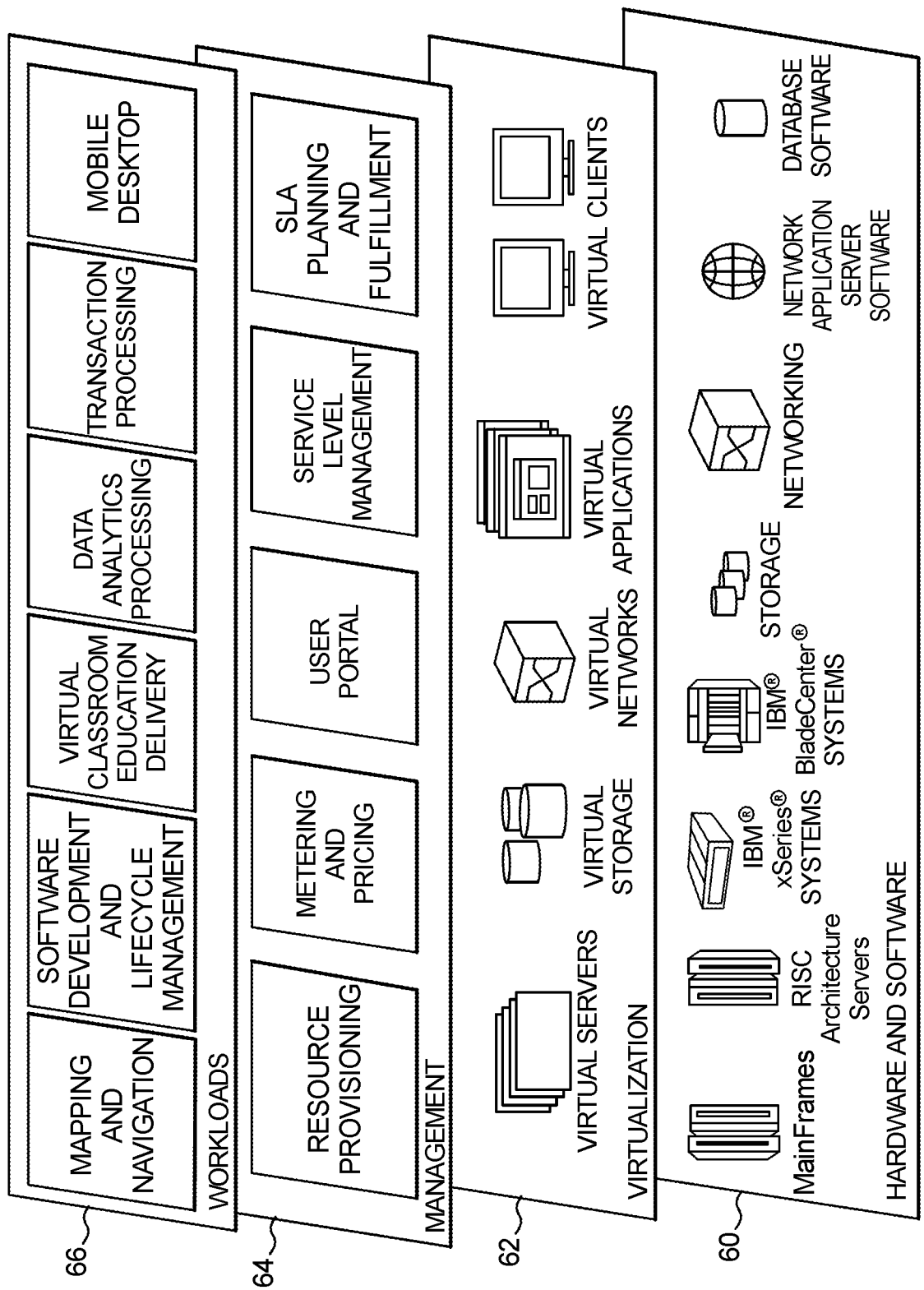
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Application performance monitoring (APM) in distributed applications involves tracking performance of individual transactions as they flow through various components, monitoring the performance of individual components, identifying the performance bottlenecks during runtime and pin-pointing the cause of the anomaly. One or more embodiments provide a system that enables cloud operators (PaaS or IaaS) to provide APM as a core service to the cloud's tenant applications.

One or more embodiments target distributed applications running on a multi-tenant cloud infrastructure that uses Software Defined Networking (SDN) to manage network connectivity across the data center. The applications' components are distributed across the data center. The profiling system runs as a part of the cloud operator's management software stack and uses a passive, agentless approach to monitor the execution of one or more applications. Profiling is achieved in two stages: first, the network packets entering and/or leaving the components of the distributed application are mirrored (copied) to a remote repository; second, the saved network traces are analyzed to identify performance bottlenecks, track transactions, etc. The system leverages the SDN infrastructure to mirror traffic entering and/or leaving virtual switch ports on physical hosts used by the applications' components. Profiling can be enabled and/or disabled on-demand independent of other tenants in the cloud infrastructure and the analysis (including protocol decoding, session reconstruction, etc.) can be done in real-time as the packets arrive, or offline, depending on the analytics software being used.

Advantages over existing solutions include, for example:

Agent-based solutions (e.g., AppDynamics, New Relic, IBM Tivoli, etc.) require loading a special language-runtime specific agent into each service instance. The agent monitors requests entering and leaving the application and logs appropriate information. Applications using unsupported languages cannot benefit from this technology.

Agentless network-based solutions (e.g., ExtraHop Networks) require network packets from the application to be mirrored to specialized hardware appliances. Large scale data centers such as those owned by cloud operators, are constantly growing and evolving. Integrating such dedicated appliances into the evolving network fabric leads to device sprawl, scalability and manageability issues.

All existing solutions operate at the application level or require that the users own the infrastructure. They are third-party add-ons that users purchase and integrate into the users' application deployment. Cloud operators (such as Microsoft, Amazon, Google, IBM) do not offer performance monitoring solutions as an integral part of the cloud infrastructure. Such an offering would eliminate the complexity of explicitly integrating third-party solutions and the need to configure them on an operator-specific basis. All applications running on the cloud can be supported, instead of a limited subset. One or more embodiments are multi-tenancy aware, adapt to changing application topologies, and require no dedicated hardware for capturing network traffic.

Figure 4:
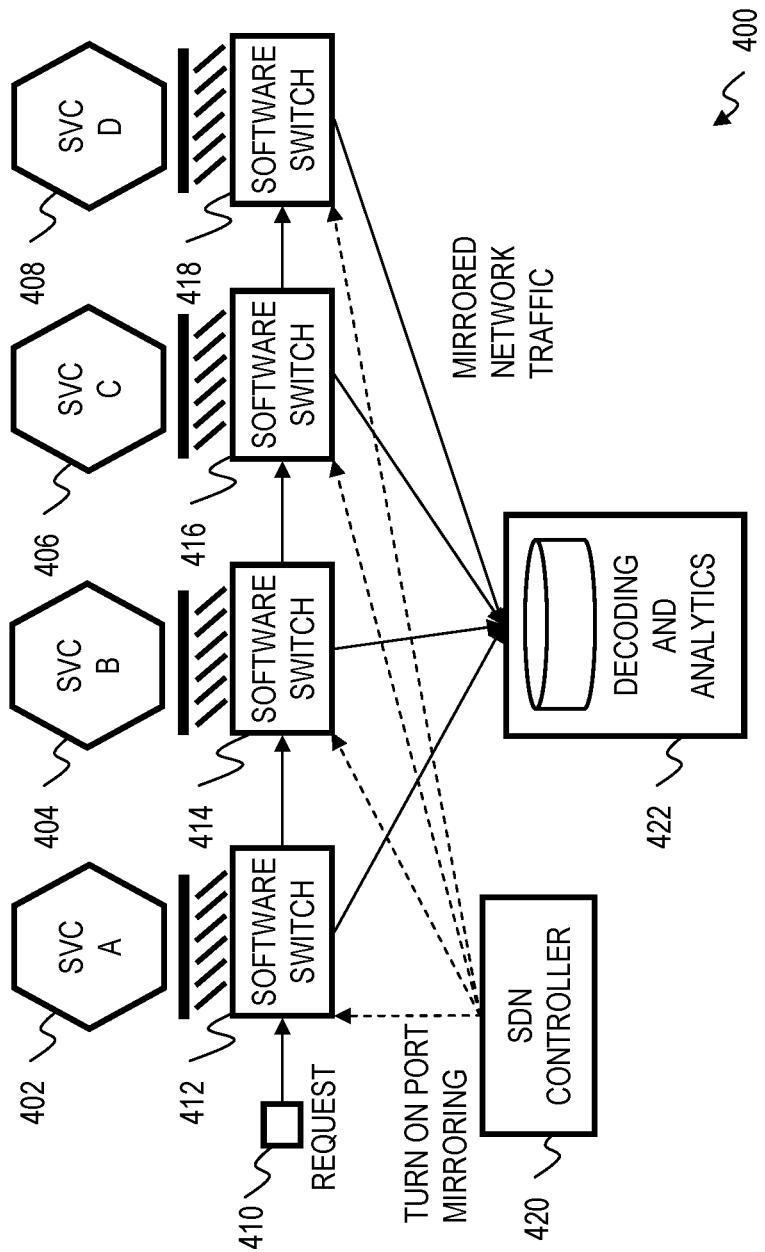
FIG. 4 depicts an exemplary system, according to an embodiment of the present invention.

Regarding setup, in one or more embodiments, referring to system 400 depicted in FIG. 4, the distributed application has multiple components (referred to as services A, B, C, and D, numbered 402, 404, 406, 408 from here onwards) spread across several physical hosts in the data center. The components of the distributed applications can be shared amongst multiple tenants (e.g., a virtual machine (VM) hosting a database service) or be exclusive to a tenant. The distributed components cooperatively respond to a request 410. In an SDN-based cloud infrastructure, each physical host has a virtual switch 412, 414, 416, 418 connecting multiple virtual ports to one or more physical Ethernet ports. The services running on the host are attached to the virtual switch ports. The SDN controller 420 sets up network paths (flow forwarding rules) to connect the various services of an application spread across multiple physical hosts in the data center. The location of individual components is supplied by the cloud operator's management software. The developer and/or tenant turns on application profiling in an on-demand fashion. The profiling system identifies the physical hosts and the virtual switch ports for the application's services from the tenant deployment registry maintained by cloud management software. It communicates the profiling request and the application topology to the SDN controller 420. The SDN controller instructs the virtual switches 412, 414, 416, 418 at the respective physical hosts to turn on port-mirroring for traffic entering the virtual switch port belonging to the service. All traffic entering and/or leaving the specified ports is mirrored to a dedicated port on the virtual switch. This dedicated port is configured to encapsulate the application's packets and relay them to a central data store that powers various analytics software, as at 422.

One or more embodiments provide a system for cloud operators to provide agentless network-based application performance monitoring to tenants. The system scales easily as the cloud operator's data center network grows. The system is cost effective as it requires no additional investment in specialized hardware for performing APM. The system adapts easily to changes in application topology, due to elastic scaling and addition and/or removal of new types of services to the application.

One or more embodiments provide a profiling system that reduces overhead on the network during profiling by capturing traffic only from switches and ports pertaining to the application's deployment.

One or more embodiments provide a profiling system that is capable of monitoring a select subset of the application's components touched by a given request using a combination of heuristics and on-demand packet port mirroring along the course of request execution.

One or more embodiments implement a system for cloud operators to provide agentless network-based application performance monitoring comprising: an interface for customers and/or tenants to enable and/or disable monitoring on demand; an interface for customers and/or tenants to select all or a subset of the application's services and/or components to be monitored; a mechanism by which network communication amongst selected components can be monitored using switch port mirroring on the "virtual network ports" of the software switch to which the software components are attached; a mechanism to ensure that only network communication amongst software components specified by the tenants are monitored; a mechanism to control when to turn on or off the switch port mirroring for tenant networks by using the software defined network controller; and a memory storage that stores the copies of the captured packets, on which various performance analytics can be performed by the cloud operator or third party vendors.

One or more embodiments advantageously do not require dedicated hardware appliances; however, in some instances, such hardware appliances could be used to augment techniques disclosed herein.

In some instances, after the tenant enables monitoring for his or her application, the software defined network controller 420 can mirror ports in the following ways:
  a) Enable port mirroring for all components belonging to the tenant application;
  b) Enable port mirroring in a lazy manner as communication amongst components happens.

The location of individual components is assumed to be known. Typically, in a cloud environment, the cloud controller software is aware of the location of each component of every software application belonging to every tenant. Also note that one or more embodiments focus on data collection as opposed to data interpretation (performance analytics). The analytics can be performed by anyone including third party providers, the cloud operator, or even the tenant himself or herself.

At least some embodiments look at user-facing web apps rather than so-called big data systems.

Note that tools like auto-scaling assume that an application is scalable; they enable dynamic resource utilization. Performance regressions cannot always be solved by adding more resources to the application. For more information regarding auto-scaling, refer, for example, to Amazon Web Services, Auto Scaling, available from amazon dot com ("." rendered as "dot" to avoid inclusion of browser-executable code) of Seattle, Wash., US and Windows Azure Diagnostic Monitoring and Autoscaling, available from Paraleap Technologies LLC, Arlington Heights, Ill. USA.

A TAP (Test Access Point) is a passive splitting mechanism installed between a 'device of interest' and the network. TAPs transmit both the send and receive data streams simultaneously on separate dedicated channels, ensuring all data arrives at the monitoring device in real time. Most enterprise switches copy the activity of one or more ports through a Switch Port Analyzer (SPAN) port, also known as a mirror port. An analysis device can then be attached to the SPAN port to access network traffic. Tap and/or SPAN ports may be pertinent in some cases.

Web applications in hosted cloud environments are evolving towards a microservice-oriented architecture. The application is functionally decomposed into a set of collaborating services, each of which can be scaled, upgraded, and managed independently by different developers. Since multiple networked services work in coalition to generate a response to the user's request, an end-to-end view of the application execution is quite pertinent to diagnosing performance degradation issues in production deployments. One or more embodiments provide profiling tools in a cloud environment, wherein the performance profiling is offered as a core cloud service similar to services like auto scaling, load balancing, etc.

One or more embodiments provide a system-level application-agnostic service for performance profiling in a multitenant cloud, which leverages the SDN substrate in data centers to provide each tenant with an on-demand, lightweight profiling service that logs network communication only among microservices in the tenant's deployment. This data is further enriched with application layer logs. To satisfy the (near) real-time reporting requirements, the profiled data is processed through stream-based analytics services. Compared to state of the art systems, one or more embodiments do not rely on dedicated middlebox appliances for packet capture, nor do they require invasive instrumentation of the application.

Enterprise applications migrating to multi-tenant public cloud environments are adopting the microservice approach to cloud application design. Applications are structured as a loosely-coupled collection of small and independent services that communicate with each other only through well-defined APIs. As exemplified by the Netflix architecture, this approach simplifies the design of scalable and robust cloud applications while enabling developers to quickly deploy and test new features, fix bugs etc., for the services they own. While this modular approach yields many benefits, it creates a complex and volatile setup. Typical enterprise applications are composed of hundreds of instances of heterogeneous microservices. With developers constantly improving or adding new features to their respective microservices and deploying them directly to production, performance regressions are no longer a rarity. As the deployment grows and diversifies over time, multiple versions of an application workflow begin to coexist. Efficiently managing application performance in such polymorphic environments is pertinent to maintaining the end user experience while interacting with the application. A real-time end-to-end performance management tool for cloud applications is thus advantageous.

Application performance management can advantageously be offered as a first-class service by the cloud provider, akin to system services like auto scaling, load balancing, etc. Existing approaches to performance management involve code injection, customized language runtimes, bytecode analysis, dedicated hardware middleboxes or changes to the network protocols.

None of these approaches are scalable or even feasible inside a commodity cloud data center hosting thousands of customer applications whose deployment topology and implementation changes very frequently. While this environment may resemble some of the large scale deployments found in Google, Facebook, etc., their solutions are heavily customized to their workload requirements.

Performance management involves monitoring, analyzing, and responding to performance events during production. Existing systems provide passive profiling and analysis while the task of responding to the situation is left to the application owner. We have found that the most common, immediate and short-term response to a performance regression is to revert the system to a known state in the past. While some solutions take the effort to automatically fix issues in the underlying network, when it comes to microservices based distributed applications, none of the existing solutions attempt to automatically deploy interim solutions to mitigate the performance bottleneck.

One or more embodiments provide a system-level performance management service that is capable of profiling a tenant's application deployment with minimal impact on other co-located tenants, as well as analyzing the information and taking automatic actions to mitigate performance issues when possible. One or more embodiments decouple gathering of profiling information from its interpretation. The profiling information includes traces of network communication among microservices as well as application supplied logs. There exists an array of tools for analyzing data streams at line rate that can be readily leveraged to provide in-depth information such as end to end throughput, resource consumption, etc., in real-time to the application owner. Non-limiting examples of such tools include (1) NEUMEYER, L., ROBBINS, B., NAIR, A., and KESARI, A., "S4: Distributed Stream Computing Platform," in IEEE International Conference on Data Mining Workshops (ICDMW) (2010); (2) ZIKOPOULOS, P., and EATON, C. *Understanding Big Data: Analytics for Enterprise Class Hadoop and Streaming Data,* 1st ed. 2011; and (3) APACHE SPARK, Lightning-fast cluster computing, available from The Apache Software Foundation, Forest Hill, Md., US, all three expressly incorporated herein by reference in their entireties for all purposes.

Accordingly, one or more embodiments advantageously advance the state of the art by simplifying the data collection process and/or taking active measures when performance regressions occur. The data collection process has previously been confined to only on premise deployments that do not face the same level of scalability, maintainability and application diversity issues as a commodity cloud environment.

One or more embodiments advantageously enable the cloud operator to provide request flow tracing for a particular tenant, without having to monitor network traffic at the global scale. While network communication can generally be traced using port mirroring, existing solutions require hardware middleboxes to be deployed at the mirror traffic at the network core or top-of-rack (ToR) switches. They do not target general purpose public clouds where independent enterprise tenants share the same network. Note that software defined networking (SDN) has been widely adopted by several large scale public cloud providers. In order to trace network communication within a single tenant's deployment in a multi-tenant network, one or more embodiments provide an architecture which pushes port mirroring to the edge switches hosting individual microservices and uses the SDN controller to enable and/or disable mirroring on the fly. One or more embodiments advantageously provide a profiling technique that can be easily applied in a scalable and cost-effective fashion using existing network infrastructure in the cloud.

Indeed, one or more embodiments provide one or more of the following:

An on-demand system-level performance profiling tool for multi-tenant cloud environments hosting modern microservice-based applications A simplified profiling architecture that leverages the SDN and edge-switches to capture profiling data instead of using hardware middleboxes.

One or more embodiments provide a general purpose performance profiling and management system that operates in the control stack layer of a cloud infrastructure, in turn affording visibility into the execution of a single microservice and data flow between microservices in an application. The former can be achieved non-intrusively by analyzing logs generated during request processing, while the latter requires system-wide visibility into the entire data center network. Operating at the cloud layer enables observation of network communications of any application (legacy or not) for a wide-array of applications. In terms of system design, one or more embodiments are minimally invasive to both the cloud infrastructure and the application stack. The profiling system scales as the data center network expands. One or more embodiments advantageously do not require changes to network protocol stacks and/or do not mandate use of dedicated middleboxes or instrumented language runtimes. Furthermore, one or more embodiments support multi-tenancy, with the ability to monitor all or parts of a tenant's application in an on-demand fashion.

One or more embodiments do not necessarily address all classes of applications. The use of existing in-depth profiling tools that can pinpoint the specific line of code that is causing the regression may still be appropriate in some instances. One or more embodiments provide the developer with coarse-grained profiling information such as microservice-level call graphs, response times, etc., in order to help the developer quickly narrow down the cause of performance degradation to a small subset of candidate causes. In other words, one or more embodiments act as a first responder when a performance issue arises in production environments. In exemplary embodiments which are application-agnostic, the ability to provide fine-grained information about the execution, such as function call graphs, stack traces, slow paths in code, etc., may be restricted or limited in some cases. Known tools that provide such functionality are thus of a complementary nature to one or more embodiments.

At a conceptual level, some embodiments use distributed information flow tracking techniques solely for identifying performance regressions and mitigating them where possible. Other systems have used information flow tracking techniques for enforcing security policies and detecting access violations. It should be noted that one or more embodiments are, in essence, orthogonal to data center scale network monitoring tools that are used to monitor and mitigate issues such as link congestion. Such tools are primarily aimed towards optimizing network infrastructure utilization whereas one or more embodiments aim to optimize application performance.

Application performance management typically requires monitoring, analyzing and maintaining the performance of an application. In a standard setup, the data from the monitoring subsystem is continuously fed into a real-time analytics subsystem. The analytics subsystem generates alerts whenever it observes performance issues. The maintenance subsystem acts on the alerts, typically by launching new instances (i.e., auto scaling) or alerting the human operator. Of the three stages, the real-time analytics subsystem can be readily implemented on top of existing stream computing frameworks like the aforementioned APACHE SPARK, NEUMEYER et al. "S4: Distributed Stream Computing Platform," etc. Hence, one or more embodiments focus towards the design of the monitoring and maintenance subsystems that needs to operate in a multi-tenant environment with thousands of independent tenants (customers), with each tenant having tens to hundreds of microservice instances. One or more embodiments provide a semi-autonomous system service for per-tenant performance management in multitenant public clouds. One or more embodiments leverage software defined networking capabilities in the cloud for tenant-specific communication monitoring. One or more embodiments borrow concepts from version control systems in a novel way to provide the administrator with a programmable troubleshooting substrate to automatically repair the application.

Consider tenant-level profiling. The typical approach to profiling enterprise applications is to use runtime-specific agents or instrumented runtimes to collect profiling data during execution. One or more embodiments take an agentless monitoring approach, tracing network communication among microservices and combining them with application layer logs. Wire data captured by one or more embodiments provides information about inputs to and outputs from the microservice, while log information from the microservice describes the execution of the microservice while processing the inputs and generating outputs. One or more embodiments can advantageously be employed by cloud operators who use software defined networking (SDN) for managing their data center networks.

Figure 5:
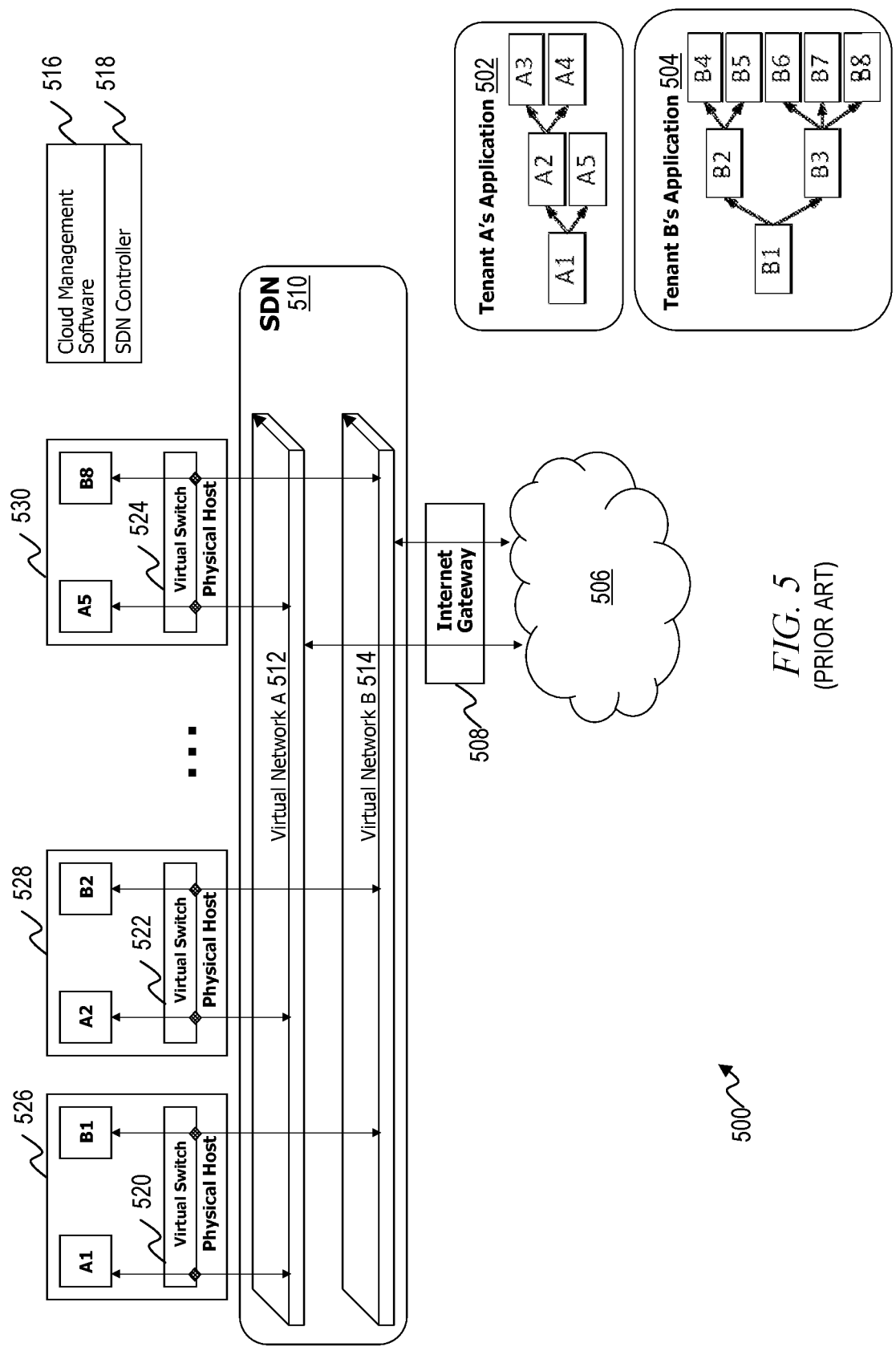
FIG. 5 shows software-defined networking and switch port mirroring, according to the prior art.

FIG. 5 illustrates the high-level architecture of a prior-art system with an agentless solution (hardware middleboxes) while FIGS. 6-9 show aspects of an exemplary system in accordance with one or more embodiments of the invention. Existing systems for tracing network communication typically include hardware packet capture appliances connected to the network core. In FIG. 5, all traffic would be mirrored from the Internet gateway 508 to such a device (device itself omitted to avoid clutter). Note Internet 506. The hardware middlebox approach can disadvantageously lead to device sprawl, management overhead, and/or unnecessary or sometimes unpermitted monitoring of communications in an environment that is otherwise compliant to certain legal regulations (e.g., Health Insurance Portability and Accountability Act (HIPAA) compliance).

Referring to FIGS. 6-9, to trace network communication among microservices pertaining to a single tenant, one or more embodiments leverage the software defined networking (SDN) substrate 610 in the data center. Many prominent cloud operators already use SDN technologies for managing the data center network, for both PaaS and IaaS environments. Rather than capturing packets at the network core, one or more embodiments push monitoring to the network edge by enabling and/or disabling port mirroring on the edge switch ports that are hosting a tenant application's microservices. Note that a tenant has to explicitly enable (opt-in) monitoring. Consequently, though multiple tenants reside on the same physical host, only those that have monitoring enabled will have their packets mirrored to the analysis subsystem.

Modern microservice-based applications typically emit log events describing various activities such as connection requests, request execution, etc. Such logs are typically forwarded to a remote log analysis framework. Refer, e.g., to ELK STACK, An End-to-End Search and Analytics Platform (see, e.g., The Elastic Stack Make Sense of Your Data, Elasticsearch BV, Mountain View, Calif., USA). By combining the communication traces with application layer log events, one or more embodiments provide existing data analytics tools with a rich dataset representing the execution of the entire distributed application, for one or more requests.

Tracking Causality:

One pertinent issue to solve while profiling distributed applications is clock synchronization across points in the system where profiling data is collected. Instead of resorting completely to probabilistic measures for correlating inputs and corresponding outputs, one or more embodiments leverage the SDN and the microservice registry in the application deployment. The types of microservices present in an application at any point in time can be obtained by querying the service registry. Refer, e.g., to HUNT, P., KONAR, M., JUNQUEIRA, F. P., and REED, B., "ZooKeeper: Wait-free Coordination for Internet-scale Systems," in *Proc. of USENIX Annual Technical Conference (ATC)* (2010), expressly incorporated herein by reference in its entirety for all purposes, and "EUREKA AWS Service registry for resilient mid-tier load balancing and failover" available from GitHub, Inc., San Francisco, Calif., US, also expressly incorporated herein by reference in its entirety for all purposes. The direction of request flow across these services can be inferred at the SDN controller that sets up the forwarding rules amongst microservice instances. This simplified approach works in a majority of situations where the request flow graph is directed and acyclic. However, there are chances of cycles in the request flow graph, in which case techniques described in previous works can be used to infer causality; examples of such previous works include: (1) AGUILERA, M. K., MOGUL, J. C., WIENER, J. L., REYNOLDS, P., and MUTHITACHAROEN, A, Performance Debugging for Distributed Systems of Black Boxes, in Proc. of ACM Symposium on Operating Systems Principles (SOSP) (2003); (2) CHOW, M., MEISNER, D., FLINN, J., PEEK, D., and WENISCH, T. F., The Mystery Machine: End-to-End Performance Analysis of Large-Scale Internet Services, in *Proc. of ACM Symposium on Operating Systems Principles (SOSP)* (2014); and (3) KIM, M., SUM- BALY, R., and SHAH, S., Root Cause Detection in a Service-Oriented Architecture, in Proc. of the ACM SIGMETRICS International Conference on Measurement and Modeling of Computer Systems (2013), all three of which are expressly incorporated by reference herein in their entireties for all purposes.

One or more embodiments thus implement a system for cloud operators to provide agentless application performance management (APM) to tenant applications by leveraging software-defined networking (SDN). In public cloud infrastructures (e.g., IBM Softlayer, Bluemix, Amazon, etc.), cloud applications are typically distributed, and are decomposed into multiple components and/or services. Components may run natively or inside virtual environments (VM, container, etc.). Components in an application are distributed across the network. Components in an application may be arbitrarily connected to each other. The infrastructure hosts multiple tenant applications simultaneously. Components from different tenants can run on the same physical machine. In application performance management (APM), end-to-end response time is monitored for user requests and performance of individual application components, trace transaction flow across components, etc. Reporting and analytics are based on monitoring data.

Referring again to FIG. 5, in software defined networking in the cloud as in system 500, each physical host 526, 528, 530 has a software switch 520, 522, 524 with multiple virtual ports to which the application's components are attached. In FIG. 5, Tenant A's Application 502 has components A1, A2, A3, A4, and A5, while Tenant B's Application 504 has components B1, B2, B3, B4, B5, B6, B7, and B8. The SDN controller 518 sets up network paths (forwarding rules) to connect the various components of an application spread across multiple physical hosts in the data center. Regarding switch port-mirroring, inbound and/or outbound packets to and/or from a switch port are also sent to a user specified port on the same switch. This is commonly used to capture network traffic passing through one or more ports on the switch, and is a common functionality in all hardware and/or software switches.

Note that in FIGS. 5-9, with the exception of the virtual switches 520/620, 522/622, 524/624 and SDN 510/610 with virtual networks 512/612, 514/614, all of the application components and/or services run on bare metal or inside a virtual environment such as a container, a virtual machine, etc.

One or more embodiments advantageously provide scalable and cost-effective APM as a core cloud service in a multi-tenant public cloud infrastructure. When the customer enables APM as at 632 in the system 600 of FIG. 6, the SDN controller 618 instructs the software switches 620, 622, 624 hosting the application's components A1-A5 or B1-B8 to turn on port-mirroring, as at 634 in FIG. 7. Note physical hosts 626, 628, 630; Internet gateway 608, and Internet 606. Mirrored packets are routed to a remote packet data repository 638, as seen at 636 in FIG. 9. Only the virtual ports hosting the application's components are port-mirrored in one or more embodiments. Profiling can be enabled and/or disabled on-demand, independent of other tenants in the cloud infrastructure. Profiling can be enabled for a subset of components, as at 634 in FIG. 8 (A1 and A5 only).

One or more embodiments allow a cloud operator to provide APM as a core service to all its customers. One or more embodiments are multi-tenancy aware, dynamic, lightweight, and/or require no dedicated hardware for capturing network traffic.

Current APM solutions include agent-based APM and agentless APM. In the former, software agents are loaded into each component to record performance metrics during component execution. Software agents are specific to the program runtime. Applications using unsupported runtimes cannot be monitored. In the latter, network traffic (wire-data) is captured among components, and a packet's payload is analyzed to trace transactions, calculate response times, etc. The latter is agnostic to the software and/or runtimes used by the components, and supports both legacy and modern applications. One or more embodiments employ an improved agentless APM approach.

Furthermore in this regard, existing agentless solutions require dedicated hardware appliances. This approach is infeasible for a cloud operator as: the data center network is constantly evolving and growing, and constantly re-integrating hardware appliances into the network topology results in high management complexity. Furthermore, the data center network is shared by multiple tenants, and current APM appliances have no concept of multi-tenancy. One or more embodiments, in contrast, do not require any additional hardware. Thus, current agent-based monitoring solutions require the customer to integrate the agent into their application, and only components that use supported runtimes (e.g., JAVA, PYTHON, C) can be monitored, while current agentless monitoring solutions require dedicated hardware appliances, which results in manageability issues in large-scale data center networks, and lack of support for multi-tenancy. Also, current agent-based monitoring solutions do not scale because of apps being written in many different languages.

One or more embodiments advantageously leverage the SDN, address multi-tenancy in a cloud environment, and/or target integration into a cloud operator's data center infrastructure.

By way of review and provision of additional detail, in a multitenant deployment, multiple customers share the same hardware infrastructure. Providers such as IBM, Google and Microsoft virtualize the infrastructure, multiplexing amongst multiple tenants (resource sharing). Within this context there is the field of Information Technology (IT) Operational Analytics. In the traditional model, entities have their own data centers and desire a full view of what is going on inside their own data center; e.g., how many VMs are running, what is the network traffic like, etc. There are also higher level needs, such as the need to know what is happening inside an application, beyond mere resource and power utilization. For example, if an online banking site or social media site are very slow, people may leave and go somewhere else. It is desirable to be able to determine the quality of the user experience. This is known as application performance management—entities seek to know, among other things, what percent of time users spend on different tasks, what the end-to-end response time is, and so on.

In a cloud deployment, the web site owner will want to know how long it takes to process a request such as 410. Components may include, e.g., a web server which accesses a database to fetch something, a local server for some other purpose, and the like. Everything is composed into a single web page and returned to the client's browser. Thus, a single request may involve, e.g., 4-5 different components. If one component is slow, the user's end-to-end experience will be degraded due to poor response time (e.g. 10 sec instead of 5 milliseconds). Application performance management attempts to solve these kinds of problems. All aspects of cloud deployment are monitored to yield helpful metrics.

For example, a well-known e-commerce web site may list product name, a picture, details, related products, reviews, and the like. In some cases, the line right below the product name may have a star rating, e.g., four stars or five stars. This data will be obtained from a different server that computes the star metric. Pictures of the product are obtained from another set of servers; a list of related products is obtained from still another set of servers, and so on. The user may query on a water bottle and other products related to water bottles may be displayed. The review section will be obtained from yet another server, which accesses a database to retrieve the reviews. Thus, a single request is translated to many sub-requests. Finally, the composition of the web page is undertaken and the user perceives a single integrated web page.

Another aspect involves software defined networking (SDN). In a conventional "hard-wired" deployment, consider, e.g., five servers and three switches; plug the servers into the switches, connect the switches together, power on and the system will work out of the box because the switches have firmware for passing packets. In a more sophisticated approach, consider, e.g., ten computers and three switches; but with a desire to partition the ten computers into two sets of five which can talk amongst themselves but not to computers in the other group. Currently, this will involve a fairly difficult one-time deployment with changes to the switch configurations. Software defined networking deploys a software abstraction or library over the switching interfaces. A human can define in simple, human-understandable terms, how each machine is to be able to communicate with the other machines in the network. A piece of software called the SDN controller 518 takes the human-understandable rules and converts them to instructions in the specific format used by the different switch vendors (each vendor typically has its own format). SDN enhances flexibility and allows for dynamic definition within the cloud infrastructure. Suppose a company, which is a client of a cloud service provider, has 500 virtual machines (VMs) spread across one or more cloud data centers, and wants to have their network isolated from the other clients of the cloud service provider. SDN allows a cloud provider to effectuate this without manually programming every switch, creating a virtual network. In FIG. 5 note virtual network A 512 and virtual network B 514. Harking back to the five servers and three switches example, if an SDN rather than hard-wired approach was employed, connect the three switches to an SDN controller, connect the five machines to the three switches, and power them all on. The machines will not be able to communicate with one another until the SDN controller pushes packet forwarding rules out to the switches.

Still another pertinent aspect is switch port mirroring. This is similar to a packet forwarding rule. Switches typically have multiple ports. Hardware switches may have, e.g., 48 or 64 ports. Software switches can have thousands of ports, because of the implementation in software. Switch port mirroring can be used with both hardware and software switching. Instructions are given to the switch that, whenever it sees a packet coming in on a particular port, it should also copy that packet to another predetermined port. Suppose a switch is connected to Machine 1, Machine 2, and Machine 3. A port mirroring rule can be written which says that whenever a packet is seen coming in from Machine 1, also copy the packet to a specific port that is connected to Machine 3. Machine 3 may act as, for example, as a network monitor, capturing all the communications from Machine 1 and Machine 2 and undertaking security and/or performance analysis thereon.

Switch port mirroring thus effectively establishes a virtual circuit within a switch. Referring to FIG. 5, the virtual switches 520, 522, 524 are software switches. There are VMs such as A1, A2 . . . A5 and B1, B2 . . . B8. There are virtual networks A and B, numbered 512, 514, which are set up via the SDN controller 518 establishing forwarding rules. For example, whenever a packet from A1 is seen destined for A2, put it on port number 4; whenever a packet from A1 is seen destined for A5, put it on port number 5. Port mirroring can also be employed. For example, anything coming from A1 is mirrored to a special port connected to, e.g., an anti-virus application. FIG. 5 thus shows a prior art cloud implementation with an SDN 510 on the data center, wherein each tenant has its own logical network, isolated from the logical networks of the other tenants. Applications A and B are sharing the same physical infrastructure, but they cannot see or talk to each other. Elements A1, A2 . . . can be actual hardware machines, virtual machines, or software containers, for example. Cloud management software 516 can provide management functionality as described above with respect to FIG. 3, for example.

Figure 6:
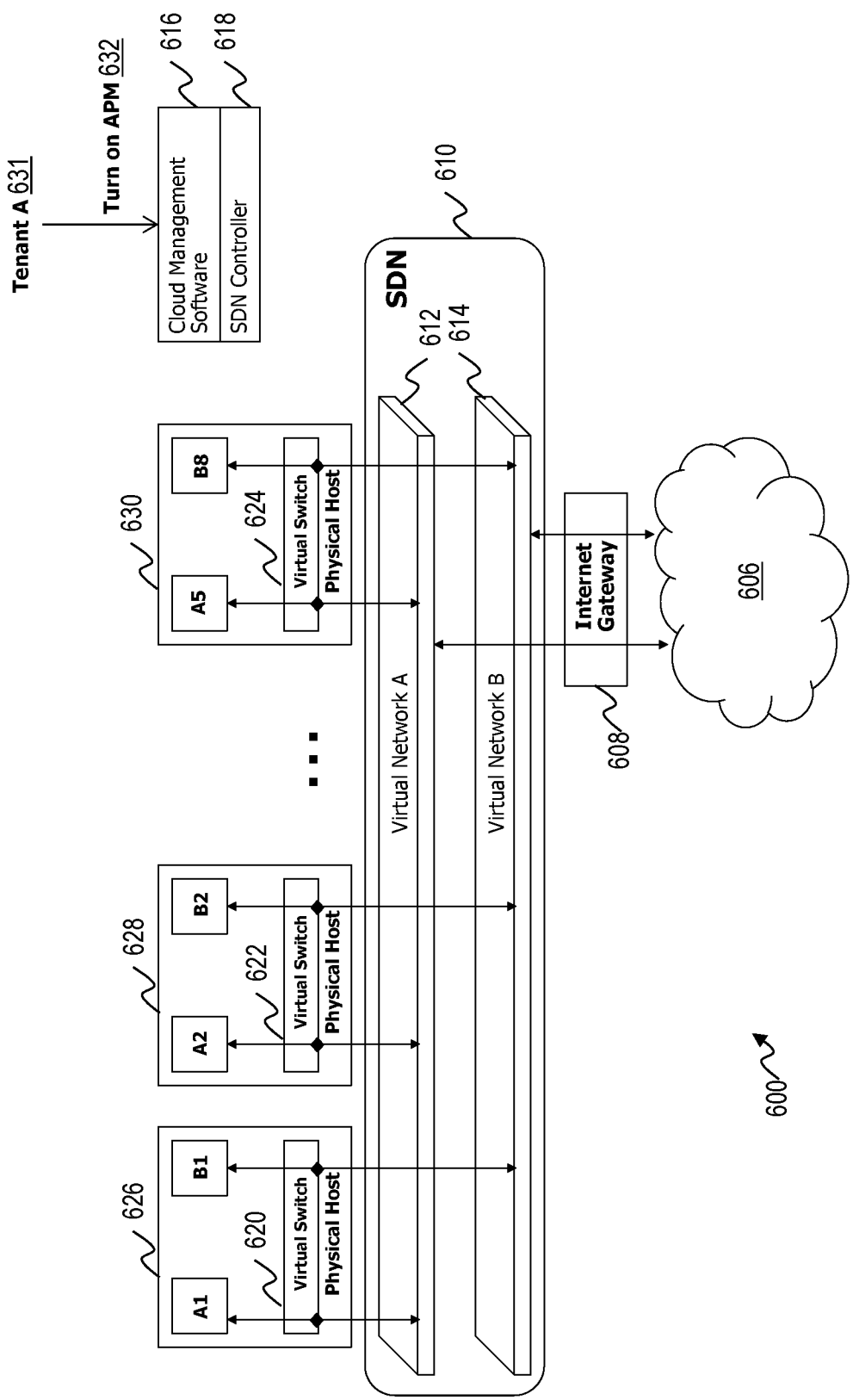
FIG. 6 shows activation of application performance monitoring, according to an embodiment of the present invention.

As noted, one or more embodiments provide APM as a cloud-based service. For example, how long A1 . . . A5 took to process a request, and if response time is slow, which component is at fault? One or more embodiments take an "on-demand" approach rather than an "always monitor" approach. Referring to FIG. 6, the customer (e.g. Tenant A 631) can access the cloud profile (cloud management software 616) and indicate that monitoring is desired, as shown at 632. The SDN controller 618 talks to all switches 620, 622, 624 hosting the components of a specific application (say, Application A), and advises them that every packet coming into Application A or going out of Application A should be mirrored to a specific remote server, as seen at 636, 638 in FIG. 9. Typically, traffic will be monitored for only the tenant that has enabled monitoring, and not for the other traffic of the other tenant(s). Note that elements in FIGS. 6-9 analogous to those in FIG. 5 have received the same reference character incremented by one hundred.

Another pertinent aspect is that the profiling can be done on-demand in real time due to use of dynamic SDN control wherein rules can be dynamically enabled and disabled; forwarding rules can be pushed and/or deleted at any time. It would typically not be desirable to run at all times, as performance would be slowed down.

Still another pertinent aspect is illustrated in the five hundred VM case wherein only five VMs are suspected as being problematic, diagnostics can be enabled for only those five VMs, in one or more embodiments.

Figure 7:
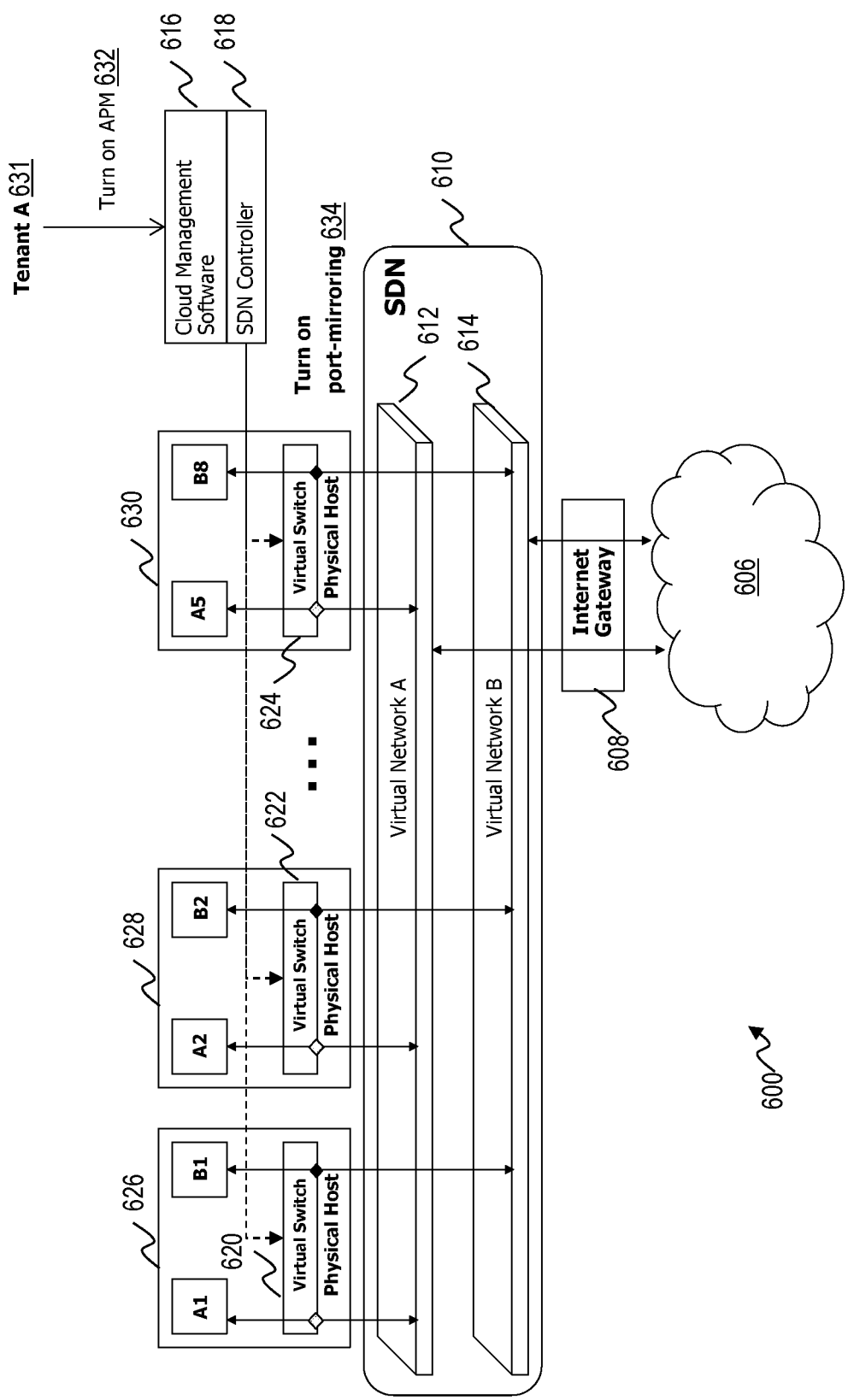
FIG. 7 shows activation of port mirroring, according to an embodiment of the present invention.
Figure 8:
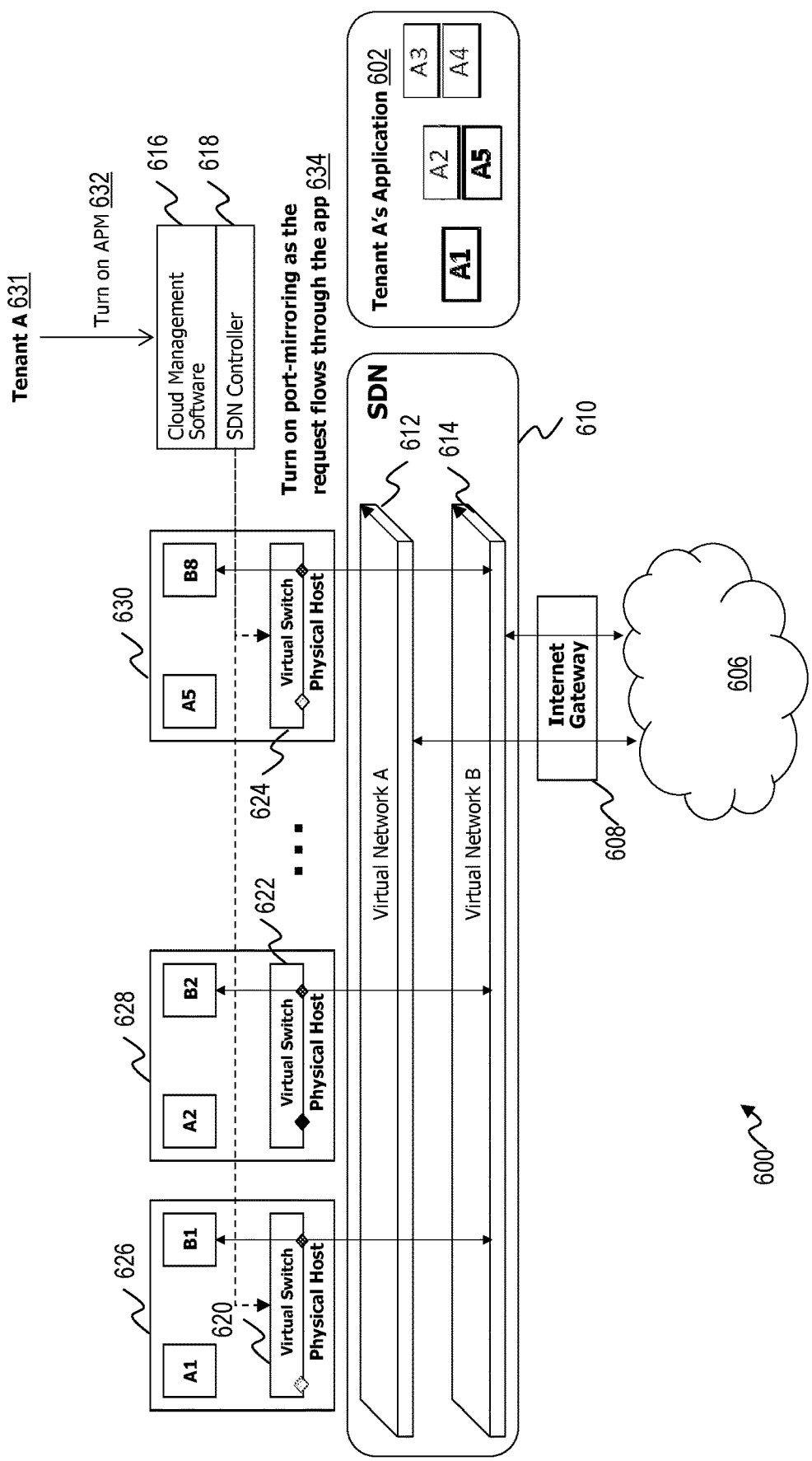
FIG. 8 shows activation of port mirroring for selective monitoring, according to an embodiment of the present invention.
Figure 9:
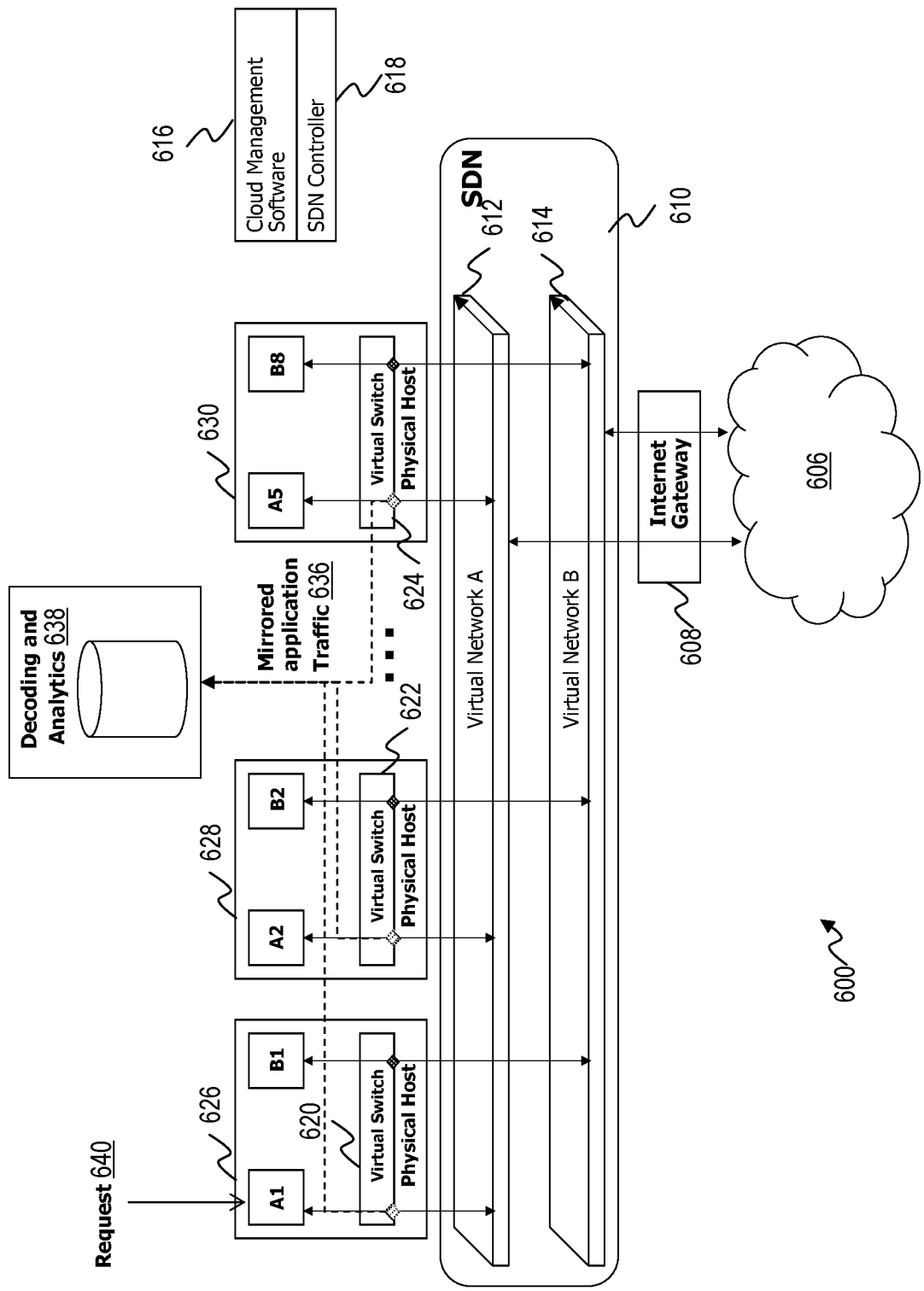
FIG. 9 shows mirroring of application traffic for decoding and analytics, according to an embodiment of the present invention.

As noted, in FIG. 6 at 632, Tenant A 631 enables APM, e.g., via an interface in the cloud management software 616 (e.g., dashboard). In FIG. 7 at 634, the cloud management software 616 communicates with the SDN controller 618, which talks to the software switches 620, 622, 624 in each physical host and tells them to enable port mirroring for all the ports where (only) Application A's components are hosted. The virtual switches are "dumb" and follow the instructions from the SDN controller 618. The cloud management software 616 will include and/or have access to a database which contains data on which physical hosts are hosting Application A's components. In FIG. 9, when a request 640 comes in to A1 after APM has been enabled, and goes to A2, A3, A4, and A5, as the request passes through multiple components, each virtual switch mirrors the packets to the remote decoding and analytics server (mirrored application traffic), as at 636, 638. The packets are decoded therein and the end-to-end execution of the packets is reconstructed.

Some embodiments are capable of selective monitoring. Referring back to FIG. 8, selective monitoring of only A1 and A5 of Tenant A's application 602 (A1 and A5 have bold outlines at the lower right) is enabled, since only those are slow. Thus, the SDN controller 618 transmits the port mirroring request to A1 and A5 but not to A2, A3, or A4 (in the figures, a solid filled diamond on the edge of a box representing a virtual switch means port mirroring is off while a diamond with light downward hatching means port mirroring is on).

In some cases, port mirroring is enabled immediately, as soon as the tenant requests APM; in other instances, port mirroring is only enabled on-demand—in such instances, port mirroring is implemented as events are happening (staged port mirroring).

Advantageous aspects of one or more embodiments include data collection using SDN and port mirroring, in a tenant-specific fashion. Decoding and analytics 638 in FIG. 9 can be implemented by the skilled artisan with known systems, given the teachings herein, and will be discussed further below.

One or more embodiments of the invention are agentless but software-based. As used herein, each tenant is a separate customer (e.g., separate company) as opposed to merely a separate application.

It is worth noting that the Big Tap Monitoring Fabric of Big Switch Networks provides a hardware/software approach to traffic monitoring. Dedicated switching hardware has to be deployed across the network to monitor network traffic. At least some embodiments provide a software-based approach that does not require any additional software on top of existing software, to acquire network traffic pertaining to a single tenant network. Also, the Big Tap Monitoring Fabric's notion of multi-tenant is different from that of one or more embodiments. Tenants, according to Big Tap Monitoring Fabric are "internal" teams from the same organization (who work collaboratively with other teams). In one or more embodiments, each tenant is an enterprise customer, "external" to the cloud provider's organization. Each of these tenants may be competitors in a given market.

Big Tap Monitoring Fabric can monitor traffic starting from the top-of-rack switch. It does not offer the ability to monitor traffic from the software switch present on the hypervisor on each physical machine in the rack. As a consequence, traffic from multiple customers may end up being monitored. Big Tap Monitoring Fabric is suitable for a single enterprise hosting its own private cloud, and not for a public cloud operator like IBM Bluemix, that hosts applications from other enterprise customers.

It is worth noting that Riverbed Performance and Management and Arista DANZ, from Arista, also requires dedicated hardware (Riverbed Performance Management Appliance/Arista DANZ) to be deployed across the data center network to capture traffic for analysis. One or more embodiments provide an exclusively software-based approach that does not require any additional hardware. Riverbed Performance and Management and Arista DANZ, from Arista can monitor traffic starting from the top-of-rack switch. It does not offer the ability to monitor traffic from the software switch present on the hypervisor on each physical machine in the rack. As a consequence, traffic from multiple customers may end up being monitored. Riverbed Performance and Management and Arista DANZ, from Arista is suitable for a single enterprise hosting its own private cloud, and not for a public cloud operator like IBM Bluemix, that hosts applications from other enterprise customers.

It is worth noting that US Patent Publication 2015-0039744, Elastic WAN Optimization Cloud Services, assigned to Cisco Technology, Inc., describes a system that uses SDN to detect when a tenant network's traffic exceeds pre-defined thresholds and to automatically compress all traffic in the client network (WAN optimization) in order to reduce the performance overhead. This document, in essence, describes a bandwidth monitoring and optimizing tool, which does not require packet capture. One or more embodiments, in contrast, provide a performance monitoring tool that requires packet capture to accurately reconstruct execution, for the purposes of tracing a request-flow/transaction across components in a tenant application's network.

One or more embodiments advantageously provide the feature of enabling customers/tenants to enable/disable monitoring on demand and to turn on or off the switch port mirroring.

Figure 10:
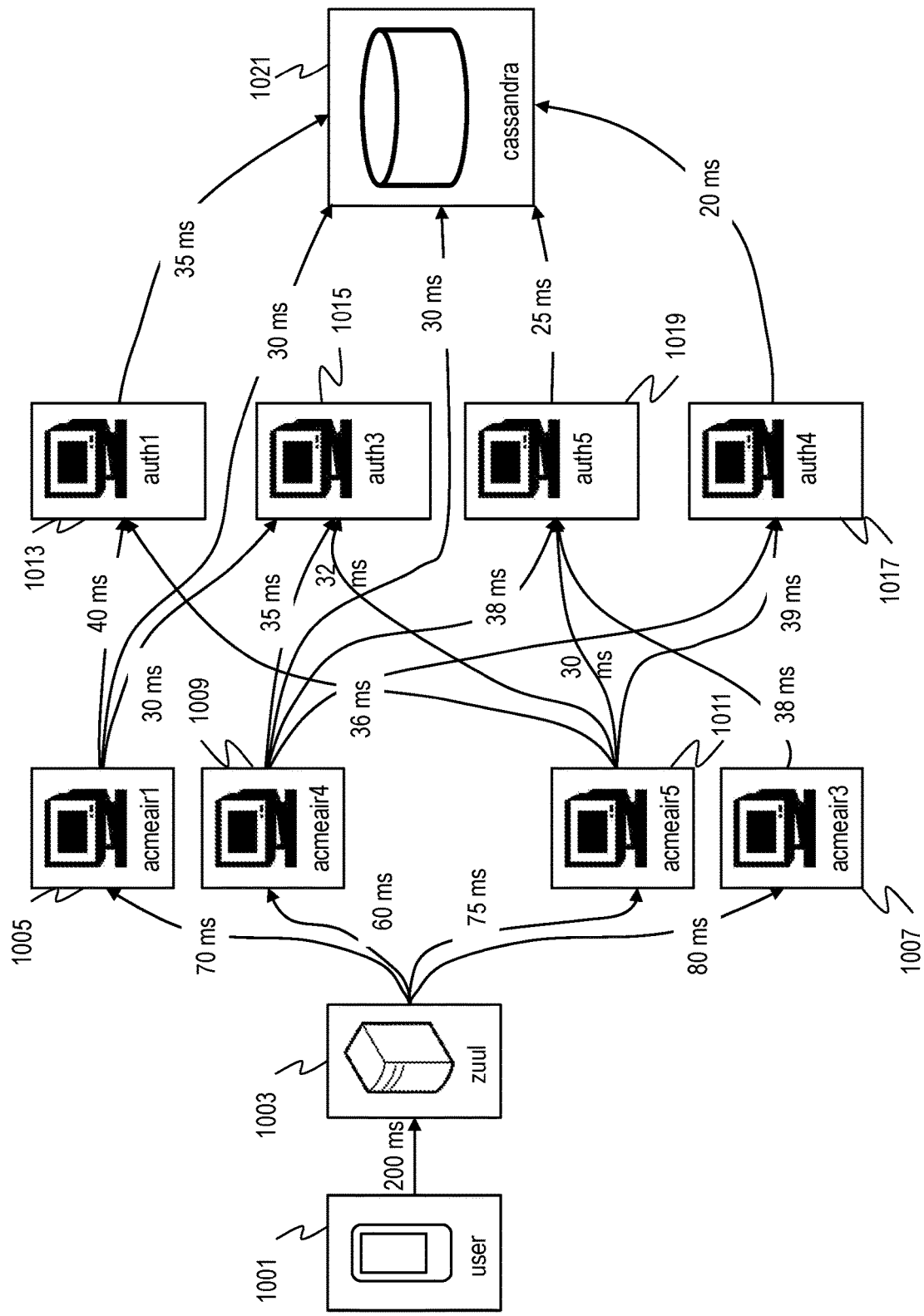
FIG. 10 shows a call graph annotated with call latencies, which can be constructed and computed in accordance with data gathered as described herein.

The article "Real-time Performance Profiling & Analytics for Microservices using Spark" by Shriram Rajagopalan et al., Oct. 20, 2015, available at the Spark Technology Center, discusses techniques that will be familiar to the skilled artisan and is expressly incorporated herein by reference in its entirety for all purposes. Techniques in the Rajagopalan et al. article collect packet traces in a different way than disclosed herein, but then carry out an analysis of the data that can also be used with data collected as disclosed herein. The packet traces are collected and the application-level content inside the packets is decoded. A request-response pair is constructed. For example, referring to FIG. 10, user 1001 calls zuul 1003; zuul 1003 calls acmeair (which includes acmeair1 1005, acmeair3 1007, acmeair4 1009, and acmeair5 1011), and so on. Note also auth1 1013, auth3 1015, auth4 1017, and auth5 1019, as well as Cassandra database 1021. The request-response pairs are constructed individually, and a causality analysis is undertaken. For example, user 1001 calls zuul 1003 and zuul 1003 calls acmeair1 1005. If that pattern is seen to be repeating, say, ten times in the packet traces, then it can be stated with a reasonable amount of confidence that zuul 1003 and acmeair (which includes acmeair1 1005, acmeair3 1007, acmeair4 1009, and acmeair5 1011) are related, since it can be inferred that any call from the user will result in a call to acmeair. In this manner, the system topology can be constructed without knowing a priori how the application is structured. FIG. 10 thus shows a call graph discovered by the techniques in the Rajagopalan et al. article which is also annotated with mean inter-service call latencies computed by the techniques in the Rajagopalan et al. article.

The graph of the application is not known a priori (which service is talking to which other service(s))—the techniques set forth in the Rajagopalan et al. article allow discovery of the topology; they also point out the average latency between microservices in a distributed application. (Microservices, as used herein, refer to components or services in a distributed application). The techniques set forth in the Rajagopalan et al. article thus permit discovery of the topology (application graph) and then the latency between components in the topology (in terms of the application-level latencies—network and processing latencies). For example, if acmeair is calling auth1 1013, it may have taken the request 40 msec to go and return on the network, and it may have taken auth1 1013 30 msec to process the request. The user or client can then determine the cause of high delays and correct same (e.g., network or service). Thus, one example of a practical use of one or more embodiments is to locate the bottleneck in a distributed application and allocate additional resources to relieve the bottleneck. For example, is the delay coming from the cloud provider's network or is it coming form the application component itself? If the network is at fault, the cloud provider will reconfigure the network to correct the delay in the network link. If the component is faulty, the customer can debug the component.

Reference is also made to Marcos K. Aguilera et al., Performance debugging for distributed systems of black boxes, SOSP '03 Proceedings of the nineteenth ACM symposium on Operating systems principles Pages 74-89, ACM 2003, expressly incorporated herein by reference in its entirety for all purposes, which discloses techniques that operate in an offline fashion. All the traces are collected, analyzed offline (as one large dump of data; e.g., two hours worth), and the user is presented with a diagnosis. In contrast, one or more embodiments operate online in a streaming fashion with results presented as soon as they become available.

Referring again to FIG. 6, in one or more embodiments, code implementing aspects of the invention resides within the cloud management software 616 (which also includes other code to implement other cloud management functionality). The SDN controller 618 has the ability to instruct the virtual switches to mirror ports. The SDN controller and the virtual switches can be implemented with known, commercially available products. The virtual switches are highly programmable software components inside the operating system or control software inside the physical hosts, which hosts virtual machines or containers (e.g., hypervisors).

Figure 11:
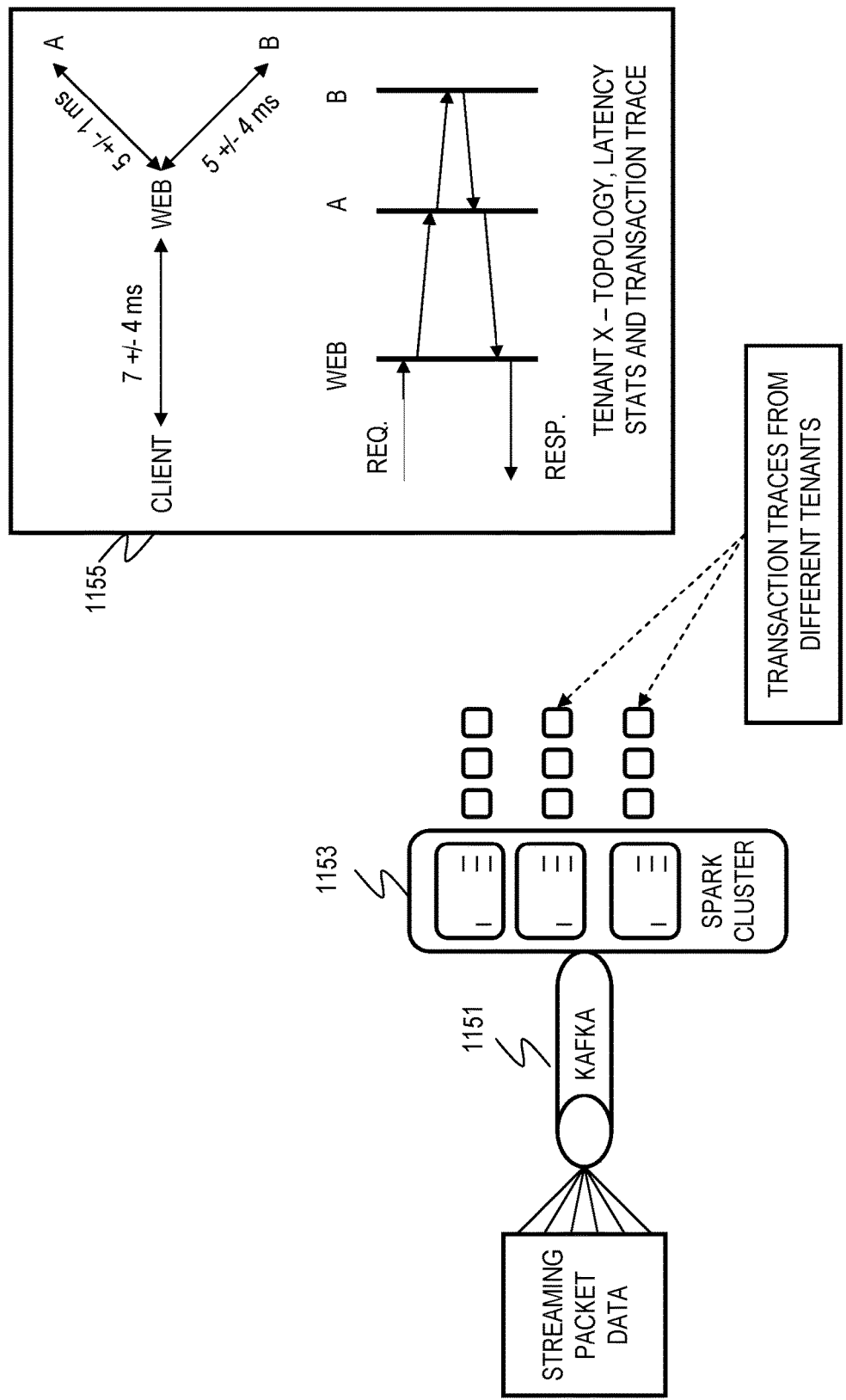
FIG. 11 shows a decoding and analytics module in the form of a Spark cluster which receives data gathered as described herein, together with exemplary output therefrom.

In one or more embodiments, decoding and analytics 638 can be implemented, for example, using Spark as a big data analytics platform. As shown in FIG. 11, the packet data from the port mirroring described above is passed to Spark cluster 1153 via an Apache Kafka high-throughput distributed messaging system 1151 (a Kafka bus) or the like. Typical output is seen at 1155, including topology, latency statistics, and a transaction trace.

Given the discussion thus far, it will be appreciated that an exemplary computing system, according to an aspect of the invention, includes a packet data repository 638, a plurality of physical hosts 626, 628, 630; a first application of a first tenant (e.g. application A of tenant A), comprising a plurality of first application components (e.g. A1-A5), distributed over the plurality of physical hosts; and a second application of a second tenant (e.g. application B of tenant B), comprising a plurality of second application components (e.g. B1-B8), distributed over the plurality of physical hosts. Also included are a plurality of virtual switches 620, 622, 624 each associated with a corresponding one of the physical hosts. Each of the virtual switches has a plurality of ports. The system further includes a first virtual network 612 coupling the plurality of first application components; a second virtual network 614, isolated from the first virtual network, coupling the plurality of second application components; and a software defined network controller 618 coupled to the virtual switches. Also included is a cloud management dashboard 616 coupled to the software defined network controller and configured to receive an application performance monitoring request from at least one of the first tenant and the second tenant. Responsive to the application performance monitoring request, the cloud management dashboard 616 instructs the SDN controller 618 to turn on port mirroring on at least a portion of those of the plurality of ports corresponding to the application of the at least one of the first tenant and the second tenant, to mirror corresponding packets to the packet data repository.

Thus, in one or more embodiments, the cloud management dashboard receives a request from the tenant and instructs the SDN controller. The cloud management may consult a database to determine how to instruct the SDN controller to turn on port mirroring (i.e., to determine which ports correspond to the application of the tenant making the request).

In one or more embodiments, the system further includes a decoding and analytics module 638 which receives the mirrored corresponding packets from the port mirroring and outputs latency data to locate a bottleneck in the application of the at least one of the first tenant and the second tenant to permit allocation of computing resources to relieve the bottleneck.

In some instances, the cloud management dashboard instructs the software defined network controller 618 to turn on the port mirroring on all of those of the plurality of ports corresponding to the application of the at least one of the first tenant and the second tenant (e.g. FIG. 7). On the other hand, in some instances, the cloud management dashboard instructs the software defined network controller 618 to turn on the port mirroring only for those of the plurality of ports corresponding to the application of the at least one of the first tenant and the second tenant which correspond to problematic ones of the first and second application components (e.g. FIG. 8 monitor only A1 and A5).

In some cases, the cloud management dashboard instructs the software defined network controller to turn on the port mirroring immediately upon receipt of the application performance monitoring request. On the other hand, in some cases, the cloud management dashboard instructs the software defined network controller to turn on the port mirroring on demand, subsequent to receipt of the application performance monitoring request, to provide staged port mirroring as discussed above.

Furthermore, given the discussion thus far, it will be appreciated that an exemplary method, according to another aspect of the invention, is disclosed for providing agentless application performance monitoring in a system wherein a first application of a first tenant, comprising a plurality of first application components (e.g., A1-A5), is distributed over a plurality of physical hosts 626, 628, 630 and coupled by a first virtual network 612, and wherein a second application of a second tenant, comprising a plurality of second application components (e.g., B1-B8), is distributed over the plurality of physical hosts and coupled by a second virtual network 614, isolated from the first virtual network. The method includes receiving, at a cloud management dashboard 616, an application performance monitoring request from at least one of the first tenant and the second tenant; and, responsive to the application performance monitoring request, the cloud management dashboard instructing a software defined network controller 618 to turn on port mirroring. The software defined network controller is coupled to the cloud management dashboard, and a plurality of virtual switches 620, 622, 624, each associated with a corresponding one of the physical hosts; each of the virtual switches has a plurality of ports. The cloud management dashboard instructs the software defined network controller to turn on the port mirroring on at least a portion of those of the plurality of ports corresponding to the application of the at least one of the first tenant and the second tenant, to mirror corresponding packets to a packet data repository 638.

In one or more embodiments the APM process is not responsible for placement or creation of the virtual network;

those are undertaken by the cloud operator. The components of the computer system work in unison to create the virtual machines and place the individual services throughout the network and so on. The APM process takes further advantage of the SDN controller and software defined network 610 to carry out the techniques set forth herein.

In some instances, the cloud management dashboard instructs the software defined network controller to turn on the port mirroring on all of those of the plurality of ports corresponding to the application of the at least one of the first tenant and the second tenant (e.g. FIG. 7). On the other hand, in some instances, the cloud management dashboard instructs the software defined network controller to turn on the port mirroring only for those of the plurality of ports corresponding to the application of the at least one of the first tenant and the second tenant which correspond to problematic ones of the first and second application components (e.g. FIG. 8 monitor only A1 and A5).

In some cases, the cloud management dashboard instructs the software defined network controller to turn on the port mirroring immediately upon receipt of the application performance monitoring request. On the other hand, in some cases, the cloud management dashboard instructs the software defined network controller to turn on the port mirroring on demand, subsequent to receipt of the application performance monitoring request, to provide staged port monitoring as discussed above.

In one or more embodiments, the method further includes sending the mirrored corresponding packets to a decoding and analytics module 638 which outputs latency data to locate a bottleneck in the application of the at least one of the first tenant and the second tenant to permit allocation of computing resources to relieve the bottleneck. Optionally, the method further includes allocating the computing resources to relieve the bottleneck.

Even further, given the discussion thus far, it will be appreciated that an exemplary non-transitory computer readable medium, according to further aspect of the invention, includes computer executable instructions which when executed by a computer cause the computer to perform any one, some, or all of the method steps described herein. These instructions, when loaded into a memory, configure one or more processors to create at least a portion of the cloud management dashboard; software defined network controller; and/or virtual switches. In one or more embodiments, the instructions implementing one or more embodiments are added to existing cloud management software 616.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

One or more embodiments are particularly significant in the context of a cloud or virtual machine environment, although this is exemplary and non-limiting. Reference is made back to FIGS. 1-3 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks shown in FIGS. 4 and 6-11.

The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computing system comprising:
   a packet data repository;
   a plurality of physical hosts;
   a first application of a first tenant, comprising a plurality of first application components, distributed over said plurality of physical hosts;
   a second application of a second tenant, comprising a plurality of second application components, distributed over said plurality of physical hosts;
   a plurality of virtual switches each associated with a corresponding one of said physical hosts, each of said virtual switches having a plurality of ports;
   a first virtual network coupling said plurality of first application components;
   a second virtual network, isolated from said first virtual network, coupling said plurality of second application components;
   a software defined network controller coupled to said virtual switches;
   a cloud management dashboard coupled to said software defined network controller and configured to receive an application performance monitoring request from at least one of said first tenant and said second tenant, and, responsive to said application performance monitoring request, instruct said software defined network controller to turn on port mirroring only for those of said plurality of ports which correspond to problematic ones of said first and second application components, said problematic ones of said first and second application components corresponding to said application of said at least one of said first tenant and said second tenant and exhibiting at least one software problem, to mirror corresponding packets to said packet data repository, wherein said cloud management dashboard is further configured to trace network communication among microservices and combine application layer logs and said network communication traces, wherein said port mirroring is controlled based on said combined application layer logs and network communication traces; and
   one or more edge switches hosting individual ones of said microservices, wherein said port mirroring is implemented on said one or more edge switches.

2. The system of claim 1, further comprising a decoding and analytics module which receives said mirrored corresponding packets from said port mirroring and outputs latency data to locate a bottleneck in said application of said at least one of said first tenant and said second tenant to permit allocation of computing resources to relieve said bottleneck.

3. The system of claim 2, wherein said turning on port mirroring only for those of said plurality of ports which correspond to problematic ones of said first and second application components is in response to a first application performance monitoring request and wherein said cloud management dashboard is configured to instruct said software defined network controller to turn on, in response to a second application performance request, said port mirroring on all of those of said plurality of ports corresponding to said application of said at least one of said first tenant and said second tenant.

4. The system of claim 2, wherein said turning on port mirroring only for those of said plurality of ports which correspond to problematic ones of said first and second application components is in response to a first application performance monitoring request and wherein said cloud management dashboard instructs said software defined network controller to turn on, in response to a second application performance request, said port mirroring immediately upon receipt of said application performance monitoring request.

5. The system of claim 2, wherein said turning on port mirroring only for those of said plurality of ports which correspond to problematic ones of said first and second application components is in response to a first application performance monitoring request and wherein said cloud management dashboard instructs said software defined network controller to turn on, in response to a second application performance request, said port mirroring on demand, subsequent to receipt of said application performance monitoring request, to provide staged port mirroring.

6. A method of providing agentless application performance monitoring in a system, said method comprising:
   distributing a first application of a first tenant, said first application comprising a plurality of first application components, over a plurality of physical hosts, said plurality of physical hosts coupled by a first virtual network;
   distributing a second application of a second tenant, said second application comprising a plurality of second application components, over said plurality of physical hosts, said plurality of physical hosts coupled by a second virtual network, isolated from said first virtual network, said method further comprising:
   receiving, at a cloud management dashboard, an application performance monitoring request from at least one of said first tenant and said second tenant;
   tracing network communication among microservices and combining application layer logs and said network communication traces, wherein port mirroring is controlled based on said combined application layer logs and network communication traces; and
   responsive to said application performance monitoring request, said cloud management dashboard instructing a software defined network controller to turn on said port mirroring, said software defined network controller being coupled to:
said cloud management dashboard, and
a plurality of virtual switches each associated with a corresponding one of said physical hosts, each of said virtual switches having a plurality of ports, said cloud management dashboard instructing said software defined network controller to turn on port mirroring only for those of said plurality of ports which correspond to problematic ones of said first and second application components, said problematic ones of said first and second application components corresponding to said application of said at least one of said first tenant and said second tenant and exhibiting at least one software problem, to mirror corresponding packets to said packet data repository.

7. The method of claim 6, wherein said turning on port mirroring only for those of said plurality of ports which correspond to problematic ones of said first and second application components is in response to a first application performance monitoring request and wherein said cloud management dashboard is configured to instruct said software defined network controller to turn on, in response to a second application performance request, said port mirroring on all of those of said plurality of ports corresponding to said application of said at least one of said first tenant and said second tenant.

8. The method of claim 6, wherein said turning on port mirroring only for those of said plurality of ports which correspond to problematic ones of said first and second application components is in response to a first application performance monitoring request and wherein said cloud management dashboard instructs said software defined network controller to turn on, in response to a second application performance request, said port mirroring immediately upon receipt of said application performance monitoring request.

9. The method of claim 6, wherein said turning on port mirroring only for those of said plurality of ports which correspond to problematic ones of said first and second application components is in response to a first application performance monitoring request and wherein said cloud management dashboard instructs said software defined network controller to turn on, in response to a second application performance request, said port mirroring on demand, subsequent to receipt of said application performance monitoring request, to provide staged port mirroring.

10. The method of claim 6, further comprising sending said mirrored corresponding packets to a decoding and analytics module which outputs latency data to locate a bottleneck in said application of said at least one of said first tenant and said second tenant to permit allocation of computing resources to relieve said bottleneck.

11. The method of claim 10, further comprising allocating said computing resources to relieve said bottleneck.

12. A non-transitory computer readable medium comprising computer executable instructions which when executed by a computer cause the computer to perform a method of providing agentless application performance monitoring in a system, said method comprising:
distributing a first application of a first tenant, said first application comprising a plurality of first application components, over a plurality of physical hosts, said plurality of physical hosts coupled by a first virtual network;
distributing a second application of a second tenant, said second application comprising a plurality of second application components, over said plurality of physical hosts, said plurality of physical hosts coupled by a second virtual network, isolated from said first virtual network, said method further comprising:
receiving, at a cloud management dashboard, an application performance monitoring request from at least one of said first tenant and said second tenant;
tracing network communication among microservices and combining application layer logs and said network communication traces, wherein port mirroring is controlled based on said combined application layer logs and network communication traces; and
responsive to said application performance monitoring request, said cloud management dashboard instructing a software defined network controller to turn on said port mirroring, said software defined network controller being coupled to:
said cloud management dashboard, and
a plurality of virtual switches each associated with a corresponding one of said physical hosts, each of said virtual switches having a plurality of ports, said cloud management dashboard instructing said software defined network controller to turn on port mirroring only for those of said plurality of ports which correspond to problematic ones of said first and second application components, said problematic ones of said first and second application components corresponding to said application of said at least one of said first tenant and said second tenant and exhibiting at least one software problem, to mirror corresponding packets to said packet data repository.

13. The non-transitory computer readable medium of claim 12, wherein said turning on port mirroring only for those of said plurality of ports which correspond to problematic ones of said first and second application components is in response to a first application performance monitoring request and wherein said cloud management dashboard is configured to instruct said software defined network controller to turn on, in response to a second application performance request, said port mirroring on all of those of said plurality of ports corresponding to said application of said at least one of said first tenant and said second tenant.

14. The non-transitory computer readable medium of claim 12, wherein said turning on port mirroring only for those of said plurality of ports which correspond to problematic ones of said first and second application components is in response to a first application performance monitoring request and wherein said cloud management dashboard instructs said software defined network controller to turn on, in response to a second application performance request, said port mirroring immediately upon receipt of said application performance monitoring request.

15. The non-transitory computer readable medium of claim 12, wherein said turning on port mirroring only for those of said plurality of ports which correspond to problematic ones of said first and second application components is in response to a first application performance monitoring request and wherein said cloud management dashboard instructs said software defined network controller to turn on, in response to a second application performance request, said port mirroring on demand, subsequent to receipt of said application performance monitoring request, to provide staged port mirroring.

16. The non-transitory computer readable medium of claim 12, wherein said method further comprises sending said mirrored corresponding packets to a decoding and analytics module from which outputs latency data to locate a bottleneck in said application of said at least one of said first tenant and said second tenant to permit allocation of computing resources to relieve said bottleneck.

* * * * *